United States Patent [19]
Downey et al.

[11] Patent Number: 6,070,546
[45] Date of Patent: Jun. 6, 2000

[54] SNOWMOBILE FLOTATION DEVICE

[76] Inventors: Hugh Downey, 147 Cook Street, Barrie, Ontario, Canada, L4M 4H1; Jay Polon, 268 Ridley Blvd., Suite 214, Toronto, Ontario, Canada, M5M 4N3; Max E. Morrison, R.R. #5, Simcoe, Ontario, Canada, N3Y 4K4

[21] Appl. No.: 09/203,398

[22] Filed: Dec. 2, 1998

[30] Foreign Application Priority Data

Dec. 2, 1997 [CA] Canada .................................. 2223312

[51] Int. Cl.[7] .................................................. B63B 43/14
[52] U.S. Cl. ............................................. 114/123; 114/68
[58] Field of Search ................................ 114/61, 123, 68, 114/360, 361, 270

[56] References Cited

U.S. PATENT DOCUMENTS

| | | | |
|---|---|---|---|
| 3,092,853 | 6/1963 | Owen . | |
| 3,340,842 | 9/1967 | Winslow . | |
| 3,797,435 | 3/1974 | Dunson | 114/68 |
| 4,864,961 | 9/1989 | Slonski | 114/360 |
| 4,887,541 | 12/1989 | Rodemann | 114/68 |
| 4,893,692 | 1/1990 | Smith | 180/190 |
| 5,113,779 | 5/1992 | Amrein et al. | 114/68 |
| 5,150,662 | 9/1992 | Boyd et al. | 114/68 |
| 5,515,802 | 5/1996 | Bree | 114/123 |
| 5,682,832 | 11/1997 | Millard | 114/123 |

*Primary Examiner*—Stephen Avila
*Attorney, Agent, or Firm*—Dimock Stratton Clarizio; Mark B. Eisen

[57] ABSTRACT

The invention provides a flotation device for a snowmobile including a plurality of preferably self-contained air bag modules having inflatable bladders affixed to the exterior of a snowmobile and adapted to inflate when a water detection device such as a float sensor is exposed to water. The inflated bladders supply sufficient buoyancy to maintain the snowmobile afloat and stable, and in the preferred embodiment are configured to provide an escape means for the occupants of the snowmobile who can use the bladder as a buoyant platform to escape to solid ice.

23 Claims, 2 Drawing Sheets

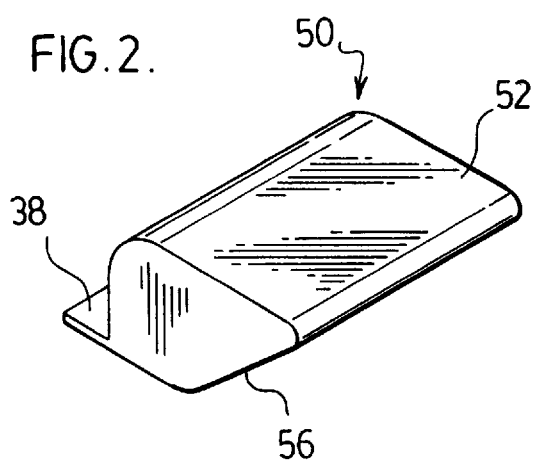
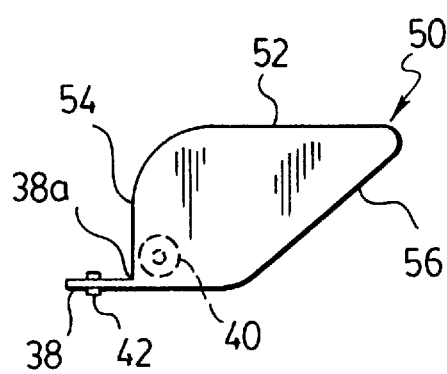
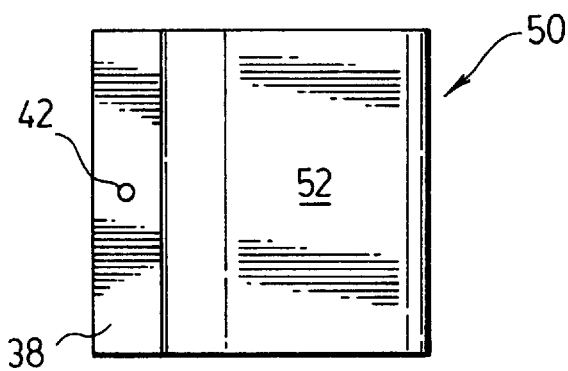
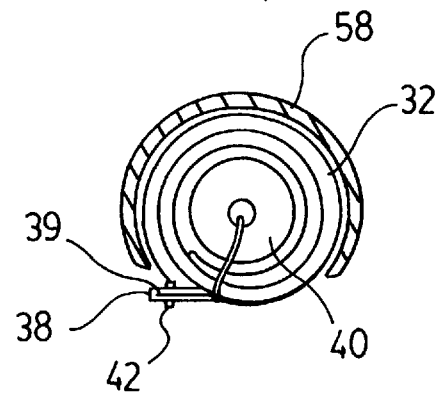

6,070,546

SNOWMOBILE FLOTATION DEVICE

FIELD OF INVENTION

This invention relates to snowmobiles. In particular, this invention relates to a flotation device for a snowmobile.

BACKGROUND OF THE INVENTION

Snowmobiles have become a popular recreational vehicle, and are also used in many colder regions as modes of transportation for domestic and commercial purposes. Frequently snowmobiles are driven on frozen lakes and rivers, which tend to provide large, open snow-covered expanses in frigid weather conditions, and occasionally a snowmobile breaks through the ice and sinks. This has resulted in many deaths and injuries, as well as loss of property. Despite that the hazards of exposure to cold water are well known, many operators persistently operate their snowmobiles in such areas and expose themselves to potential submersion in icy waters.

Flotation devices for snowmobiles are known. However, such devices are typically large and intrusive and require considerable integration into the body of the snowmobile, making them poorly suited for retrofit situations. Moreover, such devices tend to be concerned with maintaining the snowmobile itself afloat, and do not address the safety of the operator and other occupants of the snowmobile who can quickly succumb to the effects of hypothermia even when only partially submerged in frigid water.

SUMMARY OF THE INVENTION

The present invention overcomes this problem by providing a flotation device for a snowmobile comprising a plurality of air bag modules affixed to the exterior of a snowmobile, having inflatable bladders which can be inflated manually or adapted to inflate when a water detection device such as a float sensor is exposed to water. The inflated bladders supply sufficient buoyancy to maintain the snowmobile afloat, sufficient stability to maintain the snowmobile upright, and in the preferred embodiment are configured to provide an escape means for the operator and other occupants of the snowmobile who can use one of the inflatable bladders as a buoyant platform to escape to solid ice.

The present invention thus provides flotation device adapted for a snowmobile, comprising an air bag module having an anchoring portion for fastening the air bag module to the snowmobile, an inflatable bladder, a source of inflation gas in communication with the inflatable bladder, and a trigger mechanism for discharging the inflation gas into the inflatable bladder, wherein actuation of the trigger mechanism causes the inflatable bladder to inflate and maintain the snowmobile afloat in a body of water.

The present invention further provides a snowmobile comprising an air bag module having an anchoring portion for fastening the air bag module to the snowmobile, an inflatable bladder, a source of inflation gas in communication with the inflatable bladder, and a trigger mechanism for discharging the inflation gas into the inflatable bladder, wherein actuation of the trigger mechanism causes the inflatable bladder to inflate and maintain the snowmobile afloat in a body of water.

BRIEF DESCRIPTION OF THE DRAWINGS

In drawings which illustrate by way of example only a preferred embodiment of the invention, FIG. 2 is a perspective view of a preferred embodiment of a rear air bag module, FIG. 3 is a side elevation of the air bag module of FIG. 2, FIG. 4 is a top plan view of the air bag module of FIG. 2, and FIG. 5 is a cross-section of an air bag module in collapsed condition.

DETAILED DESCRIPTION OF THE INVENTION

Figure 1:
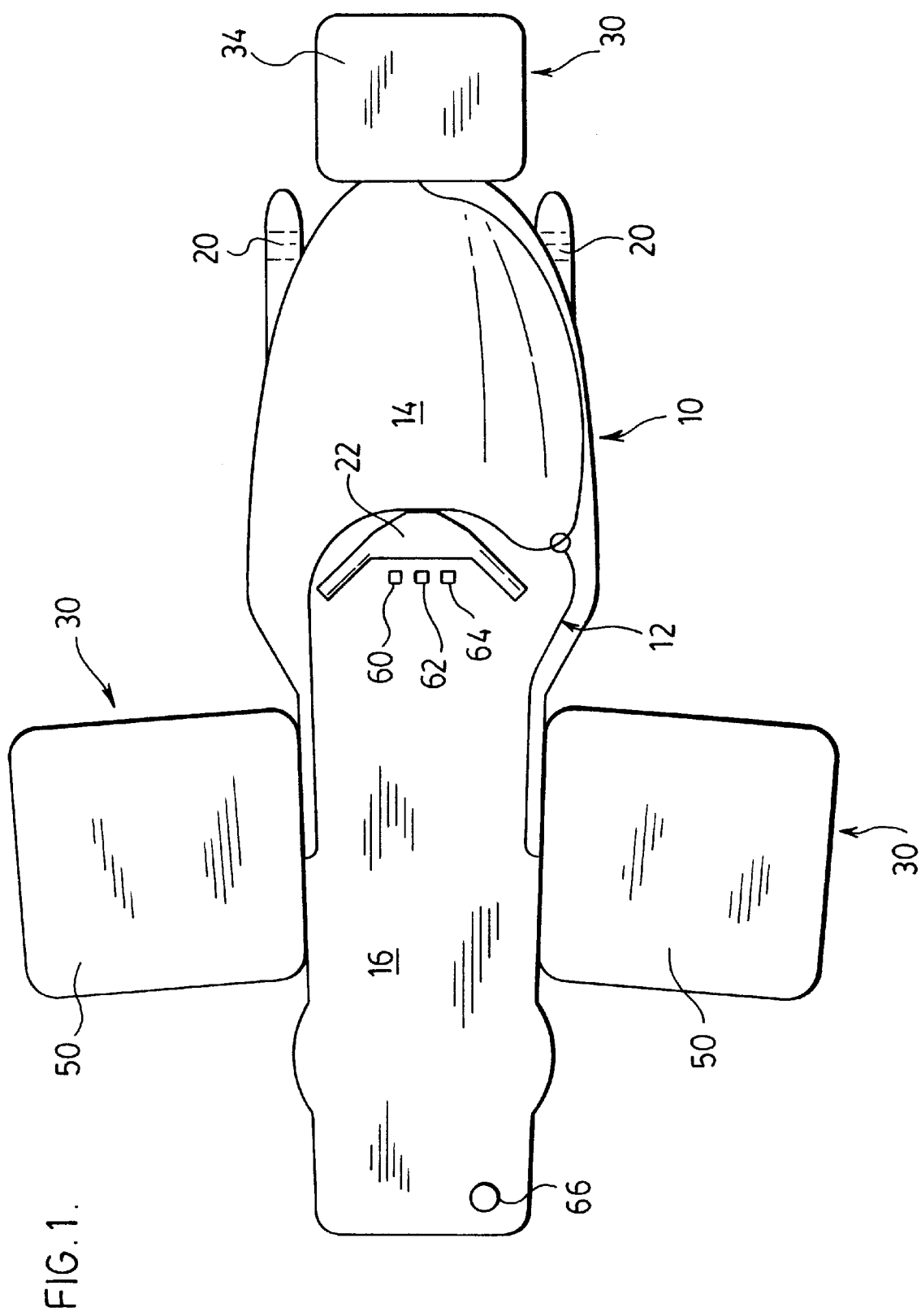
FIG. 1 is a top plan view of a snowmobile embodying the invention.

A snowmobile 10 embodying a preferred embodiment of the invention is illustrated in FIG. 1. The snowmobile 10 comprises a body generally designated 12 which includes a forward cowling 14 and a seat 16. The seat 16 is mounted over a revolving caterpillar tread (not shown), and the front of the snowmobile 10 is supported by a pair of steerable skis 20. A motor (not shown) drives the tread which propels the snowmobile 10, and the operator steers the snowmobile 10 using a steering wheel or handlebar 18 linked to the skis 20. This snowmobile construction is well known to those skilled in the art.

The invention comprises a plurality of air bag modules 30, each comprising an inflatable bladder 32, which are affixed to the body 12 of the snowmobile 10. As shown in FIG. 1, preferably a front air bag module 34 is affixed to the front end of the snowmobile 10 beneath the cowling 14 and a pair of rear air bag modules 50 are affixed to the body 20 beneath the seat 16. The air bag modules 30 provide sufficient buoyancy to keep the snowmobile 10 and its occupants afloat in the event that the snowmobile 10 breaks through the ice or otherwise ends up in a body of water. The front air bag module 34 provides the primary support for the motor while the rear air bags 50 provide the primary support for the rear of the body 12, the tread assembly and the operator and other occupants of the snowmobile 10.

In the preferred embodiment each air bag module 30 is self-contained and provides its own source of inflation gas such as a high pressure discharge gas canister 40 in communication with, or preferably contained within, the bladder 32. The source of inflation gas 40 may be actuated manually, but preferably it is coupled to a trigger mechanism such as a float sensor or buoyancy switch 42 disposed outside of the bladder 32. The trigger mechanism 42 may instead be an inductive switch, refractive sensor, pressure switch or any equivalent device which will react to the presence of water but remain unaffected by snow. The inflatable bladder 32 may be composed of vinyl, polyethylene or any other relatively strong, flexible material which is relatively gas-impervious, strong enough to withstand rapid inflation, and support the weight of the snowmobile 10 plus its operator and any other occupants.

The source of inflation gas may alternatively, or additionally, include a pyrotechnic device, preferably a low explosive compound involving a chemical reaction with low exothermic characteristics. Depending upon the nature of the pyrotechnic compound the inflation source may include an oxygen source disposed inside the bladder 32 as a source of combustion gas. Pyrotechnic charges are commonly used to deploy air bags in automobiles, and can be adapted for the present invention with little change in design. However, use of a gas discharge canister 40 may require less strength in the wall of the bladder 32, as expansion of the bladder 32 can be made to occur at a more controlled rate than in the case of a pyrotechnic discharge.

The air bag modules 30 each preferably include an anchoring portion comprising a flap 38 which is bolted or otherwise affixed by any suitable fastener to the undercarriage of the snowmobile 10. The anchoring flap 38 is preferably formed integrally with the air bladder 32, with the bladder material doubled over a rigid plastic stiffener 39 for strength and sealed along the seam 38a where the flap 38 adjoins the bladder 32 so that the bladder 32 remains airtight. In the preferred embodiment the trigger mechanism 42 is located on the flap 38, which is mounted to the snowmobile undercarriage and thus contacts the water at a very early stage in the submersion of the snowmobile 10, and is connected to the inflation gas source 40 through the seam 38a, as shown in FIG. 5. If desired one or more trigger mechanisms 42 can also be affixed to suitable locations on the snowmobile body 12.

The use of a plurality of self-contained air bag modules 30 presents the advantage that the flotation device of the invention can be retrofitted to existing snowmobiles 10 without having to accommodate bulky compressed gas canisters capable of inflating multiple bladders, or routing high pressure gas discharge lines through the body 12 of the snowmobile 10. Also, in the event of a malfinction in an inflation gas source 40, only one of the air bag modules 30 will be affected and partial buoyancy will still be available.

Frequently when a snowmobile 10 breaks through the ice covering a body of water the ice is sufficiently strong to bear the weight of the operator and other occupants of the snowmobile 10. The rear air bag modules 50, shown in FIGS. 2 to 4, are thus preferably configured with a wedge-shaped profile which provides an operator or occupant of the snowmobile Io with an escape route from the snowmobile 10 onto solid ice.

In the preferred embodiment of the rear air bag modules 50 the bladder 32 comprises a reinforced planar top surface 52 which provides a platform when the bladder 32 is inflated, a vertical wall 54 immediately adjacent to the anchoring flap 38 which bears against the side of the snowmobile body 12 when the bladder 32 is inflated and maintains the top surface 52 in a generally horizontal orientation, and an oblique outer surface 56 which rises above the waterline and can overlap a broken ice edge to bridge the gap between the snowmobile 10 and solid ice. Thus, if the snowmobile breaks through the ice an operator or occupant of the snowmobile 10 can crawl or creep over the top surface 52 of the rear air bag 50 to the nearest broken ice edge and onto solid ice. Even if the hole through the ice is large, the three air bag modules 30 illustrated will provide sufficient stability that the occupants can paddle the snowmobile 10 over to a broken ice edge and then escape onto solid ice.

In the preferred embodiment of the invention the snowmobile 10 may be equipped with a remote actuator 60 for manual activation of the air bag modules 30, for example if the ice starts to crack underneath the snowmobile 10 and the operator elects to inflate the air bladders 32 before submersion; a disable switch 62 allowing the operator to disable the flotation device on land, for example where there are exposed puddles or shallow pools of water; an enable indicator 64 indicating that the flotation device is operational; and/or an Emergency Location Transmitter (ELT) 66 activated either manually or upon activation of the trigger mechanism 42, which allows the snowmobile 10 to be located through the use of the Global Positioning System (GPS). The means of integrating such features into the flotation device of the invention will be known to those skilled in the art.

In operation, the front air bag module 34 is fastened to the front of the snowmobile, and the rear air bag modules 50 are fastened to either side of the body 12 adjacent to the tread 18. The bladders 32 are deflated and folded or rolled into a compact condition, which may be maintained using a light-gauge frangible plastic clip 58 as shown in FIG. 5. If a snowmobile 10 breaks through the ice on a body of water, the water contacts the trigger mechanism 42 causing the gas canister or pyrotechnic charge 40 to inflate the bladder 32 with gas at a high rate of inflation, breaking the clip 58. The gas renders the air bag module 30 buoyant, which keeps the snowmobile 10 afloat and stable. The operator and other occupants of the snowmobile 10 can paddle to a broken ice edge if necessary and escape to solid ice over the top planar surface 52 of one of the rear air bag modules 50. The air bag modules 30 remain inflated, keeping the snowmobile 10 afloat until help arrives to extract the snowmobile 10 from the water.

Once the air bag modules 30 have been inflated the inflation gas source 40 is depleted, and the air bag modules 30 can be deflated by puncturing the bladders 32, detached from the snowmobile 10, discarded and replaced with new air bag modules 30.

A preferred embodiment of the invention having been thus described by way of example only, it will be apparent to those skilled in the art that certain modifications and adaptations may be made without departing from the scope of the invention, as set out in the appended claims.

What is claimed is:

1. A flotation device adapted for a snowmobile, comprising an air bag module having
    an anchoring portion for fastening the air bag module to the snowmobile,
    an inflatable bladder comprising an oblique outer surface for rising over and overlapping a broken ice edge,
    a source of inflation gas in communication with the inflatable bladder, and
    a trigger mechanism for discharging the inflation gas into the inflatable bladder,
    wherein actuation of the trigger mechanism cases the inflatable bladder to inflate and maintain the snowmobile afloat in a body of water.

2. The flotation device of claim 1 wherein the trigger mechanism is actuated by the presence of water.

3. The flotation device of claim 2 wherein the trigger mechanism is a float sensor, buoyancy switch, inductive switch, refractive sensor or pressure switch.

4. The flotation device of claim 1 wherein the anchoring portion comprises a flap adjoining the inflatable bladder.

5. The flotation device of claim 4 wherein the flap is formed integrally with the bladder.

6. The flotation device of claim 4 wherein the trigger mechanism is disposed on the flap.

7. The flotation device of claim 1 wherein the source of inflation gas includes a compressed gas canister.

8. The flotation device of claim 1 wherein the source of inflation gas includes a pyrotechnic charge.

9. The flotation device of claim 1 wherein the inflatable bladder comprises a top planar surface serving as a floating platform which provides a means for an occupant of the snowmobile to escape to solid ice.

10. The flotation device of claim 9 wherein the inflatable bladder further includes a substantially vertical wall adjacent to the anchoring portion for bearing against the snowmobile and maintaining the top planar surface in a substantially horizontal orientation.

11. A snowmobile comprising an air bag module having an anchoring portion for fastening the air bag module to the snowmobile, an inflatable bladder comprising an oblique outer surface for rising over and overlapping a broken ice edge, a source of inflation gas in communication with the inflatable bladder, and a trigger mechanism for discharging the inflation gas into the inflatable bladder, wherein actuation of the trigger mechanism causes the inflatable bladder to inflate and maintain the snowmobile afloat in a body of water.

12. The snowmobile of claim 11 wherein the trigger mechanism is actuated by the presence of water.

13. The snowmobile of claim 12 wherein the trigger mechanism is a float sensor, buoyancy switch, inductive switch, refractive sensor or pressure switch.

14. The snowmobile of claim 11 wherein the anchoring portion comprises a flap adjoining the inflatable bladder.

15. The snowmobile of claim 14 wherein the flap is formed integrally with the bladder.

16. The snowmobile of claim 14 wherein the trigger mechanism is disposed on the flap.

17. The snowmobile of claim 11 wherein the source of inflation gas includes a compressed gas canister.

18. The snowmobile of claim 11 wherein the source of inflation gas includes a pyrotechnic charge.

19. The snowmobile of claim 11 wherein the inflatable bladder comprises a top planar surface serving as a floating platform which provides a means for an occupant of the snowmobile to escape to solid ice.

20. The snowmobile of claim 19 wherein the inflatable bladder further includes a substantially vertical wall adjacent to the anchoring portion for bearing against the snowmobile and maintaining the top planar surface in a substantially horizontal orientation.

21. A flotation device adapted for a snowmobile, comprising an air bag module having an anchoring portion for fastening the air bag module to the snowmobile, an inflatable bladder comprising a top planar surface serving as a floating platform which provides a means for an occupant of the snowmobile to escape to solid ice, a source of inflation gas in communication with the inflatable bladder, and a trigger mechanism for discharging the inflation gas into the inflatable bladder, wherein actuation of the trigger mechanism causes the inflatable bladder to inflate and maintain the snowmobile afloat in a body of water.

22. The flotation device of claim 21 wherein the inflatable bladder further includes a substantially vertical wall adjacent to the anchoring portion for bearing against the snowmobile and maintaining the top planar surface in a substantially horizontal orientation.

23. The flotation device of claim 21 wherein the inflatable bladder further includes an oblique outer adjoining the top planar surface for rising over and overlapping a broken ice edge.

* * * * *